(12) United States Patent
Ji

(10) Patent No.: US 7,363,444 B2
(45) Date of Patent: Apr. 22, 2008

(54) METHOD FOR TAKING SNAPSHOTS OF DATA

(75) Inventor: Minwen Ji, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 11/033,343

(22) Filed: Jan. 10, 2005

(65) Prior Publication Data

US 2006/0155946 A1 Jul. 13, 2006

(51) Int. Cl.
*G06F 12/00* (2006.01)
*G06F 13/00* (2006.01)
*G06F 13/28* (2006.01)

(52) U.S. Cl. .................................................. 711/161
(58) Field of Classification Search ................ 711/161
See application file for complete search history.

(56) References Cited

U.S. PATENT DOCUMENTS

| | | | | |
|---|---|---|---|---|
| 5,403,639 | A * | 4/1995 | Belsan et al. | 707/204 |
| 2003/0159007 | A1 * | 8/2003 | Sawdon et al. | 711/154 |
| 2004/0230596 | A1 | 11/2004 | Veitch et al. | |
| 2004/0230624 | A1 | 11/2004 | Frolund et al. | |
| 2004/0230862 | A1 | 11/2004 | Merchant et al. | |
| 2005/0091451 | A1 | 4/2005 | Frolund et al. | |
| 2005/0144199 | A2 * | 6/2005 | Hayden | 707/204 |

OTHER PUBLICATIONS

Minwen JI, Instant Snapshots in Federated Array of Bricks, Technical Report HPL-2005-15, Feb. 4, 2005, Hewlett-Packard Development Company, L.P., Palo Alto, CA.

Nabil Osorio et al., Guideline for Using Snapshot Storage Systems for Oracle Databases, 2001, Oracle Corporation, Redwood Shores, CA.

Enterprise Volume Manager and Oracle8 Best Practices, Compaq White Paper 11EE-1199A-WWEN, 2000, Compaq Computer Corporation, Houston, TX.

Validating Oracle8i and Oracle9i with EMC TimeFinder, Engineering Whitepaper, Part No. H589.1, Apr. 2002, EMC Corporation, Hopkinton, MA.

Using the FC4700 SnapView feature with Oracle 8i, A Technical Paper, 2001, EMC Corporation, Hopkinton, MA.

Performing Oracle 8i (OPS) Split Mirror Backups Using OmniBack II, 2000, Hewlett-Packard Company, Palo Alto, CA.

Usage Guide for Sun StorEdge™ Instant Image Software with Oracle8, Feb. 2001, Sun Microsystems, Inc. Palo Alto, CA.

VERITAS Database Edition™ for Oracle: Guidelines for Using Storage Checkpoint and Storage Rollback with Oracle Databases, Aug. 2001, Veritas Software Corporation, Mountain View, CA.

K. Mani Chandy et al., Distributed Snapshots: Determining Global States of Distributed Systems, ACM Transactions on Computer Systems, 1985, 3(1):63-75, ACM, New York, NY.

(Continued)

*Primary Examiner*—Matthew Kim
*Assistant Examiner*—Edward J Dudek

(57) ABSTRACT

A method for taking snapshots of data. In an embodiment, a first map data structure is obtained that records locations for a plurality of data blocks. A second map data structure is formed that is initially empty of locations, the second map data structure representing the snapshot after the snapshot is started. Writes on data that arrive before the snapshot starts are applied to the first map, and writes that arrive after the snapshot starts are applied to the second map.

37 Claims, 10 Drawing Sheets

OTHER PUBLICATIONS

Sridhar Alagar et al., An optimal algorithm for distributed snapshots with casusal message ordering, Information processing Letters, 1994, 50(6):311-316, Elsevier North-Holland, Inc. Amsterdam, The Netherlands.

Madalene Spezialetti et al., Efficient Distributed Snapshots, 6th International Conference on Distibuted Computing Systmes, 1986, pp. 382-388, IEEE, New York NY.

Arup Acharya et al., Recording Distributed Snapshots Based on Causal Order of Message Delivery, 1992, New Brunswick NJ.

Jean-Michel Helary, Observing Global States of Asynchronous Distributed Applications, Rapports De Recherche No. 1042, 1989, Unité de Recherce INRIA-Rennes, Rocquencourt, France.

Ten H. Lai et al., On Distributed Snapshots, Information Processing Letters, 1987, 25(3):153-158, Elsevier North-Holland, Inc. Amsterdam, The Netherlands.

H. F. Li et al., Global State Detection in Non-FIFO Networks, The 7th International Conference on Distributed Computing Systems, 1987, pp. 364-370, IEEE Computer Society Press, Washington D.C.

S. Venkatesan, message-optimal incremental Snapshots, Journal of Computer & Software Engineering, 1993, 1(3):211-231, Ablex Publishing Corporation, Norwood, NJ.

Friedemann Mattern, Efficient Algorithms for Distributed Snapshots and Global Virtual Time Approximation, 1993, Saabrücken, Germany.

Elmootazbellah N. Elnozahy et al., The Performance of Consistent Checkpointing, 1992, Houston, TX.

Luís Alexandre Serras de Moura e Silva. Checkpointing mechanisms for scientific parallel applications, Ph.D. Thesis, 1997, University of Coimbra, Portugal.

Richard Koo et al., Checkpointing and Rollback-Recovery for Distributed Systems, IEEE Transactions on Software Engineering, 1987, SE-13(1):23-31, IEEE, New York, NY.

Zhijun Tong et al., A Low Overhead Checkpointing and Rollback Recovery Scheme for Distributed Systems, Proceedings of 8th Symposium on Reliable Distributed Systems, 1989, pp. 12-20, IEEE, New York, NY.

Eric Anderson et al., Buttress: A toolkit for flexible and high fidelity I/O benchmarking, 3rd USENIX Conference on File and Storage Technologies, Mar. 31, 2004, pp. 45-58, Usenix Association, Berkeley, CA.

Svend Frølund et al., A Decentralized Algorithm for Erasure-Coded Virtual Disks, Jun. 28, 2004, Palo Alto, Ca.

Craig Soules et al., U.S. Appl. No. 11/051,433, filed Feb. 3, 2005.

Craig Soules et al., U.S. Appl. No. 11/051,436, filed Feb. 3, 2005.

Craig Soules et al., U.S. Appl. No. 11/051,435, filed Feb. 3, 2005.

* cited by examiner

Map State Transition

METHOD FOR TAKING SNAPSHOTS OF DATA

FIELD OF THE INVENTION

The present invention relates to the field of data storage and, more particularly, to fault tolerant data storage.

BACKGROUND OF THE INVENTION

A snapshot of data is a record that reflects the state of the data at a particular point in time. Snapshots can be used for a variety purposes, including data archiving, recovery after a hardware failure or software error, remote mirroring, report generation and decision making. As a particular example, a snapshot taken prior to the occurrence of data corruption resulting from a software error may be used to return the data to an uncorrupted state.

A consistent snapshot at time t records the results of all updates to the data before time t and does not record any results of the updates after time t. For example, for replicated data, a snapshot is consistent when the recorded replicas of the data are identical; the snapshot is inconsistent if an update has occurred to a replica of the data and not to another replica, so that the recorded replicas are no longer identical. For distributed data, a snapshot is consistent when it reflects the state of the data across all locations at the same point in time; a snapshot is inconsistent if it records a first update after time t to data in a first location but does not record a second update before time t to data in a second location. It is important to ensure that a snapshot is consistent. Otherwise, the snapshot may not be useful for its intended purpose. Typically, this means that no updates to the data can occur while the snapshot is being taken. Due to communication delays and clock skews, taking a consistent snapshot in a distributed system typically requires the suspension or alteration of other activities and takes a considerable amount of time. Thus, taking snapshots in a distributed system can significantly interfere with the performance of the system, particularly if frequent snapshots are desired.

Therefore, what is needed are improved techniques for taking snapshots in distributed systems. It is toward this end that the present invention is directed.

SUMMARY OF THE INVENTION

The present invention is a method for taking snapshots of data. In an embodiment, a first map data structure records locations for a plurality of data blocks. A second map data structure is formed that is initially empty of locations, the second map data structure representing the snapshot after the snapshot is started. A write on data is applied to the first map if the write arrives before the snapshot is started, and otherwise, the write is applied to the second map if the write arrives after the snapshot is started.

In another embodiment, a plurality of data storage devices redundantly store data. Each device has a map data structure that specifies a relationship of logical addresses to physical addresses for a plurality of blocks of the data. A first command is sent to the plurality of storage devices instructing a snapshot of the data to be prepared. Any affirmative responses are received from the plurality of storage devices. Each affirmative response indicates that the corresponding storage device is able to form a new map data structure. The new map data structure is initially empty of physical addresses. A second command is sent to the plurality storage devices. The second command instructs the snapshot to be committed if a quorum of affirmative responses to the first command is received. The second command instructs the snapshot to be aborted if a quorum of affirmative responses is not received.

These and other embodiments of the invention are described herein.

DETAILED DESCRIPTION OF A PREFERRED EMBODIMENT

The present invention is intended to provide a system and method for taking consistent snapshots in a distributed system without suspending or interfering with other activities of the system. Thus, the process of taking a snapshot may appear to occur instantaneously to applications running on the distributed system.

Figure 1:
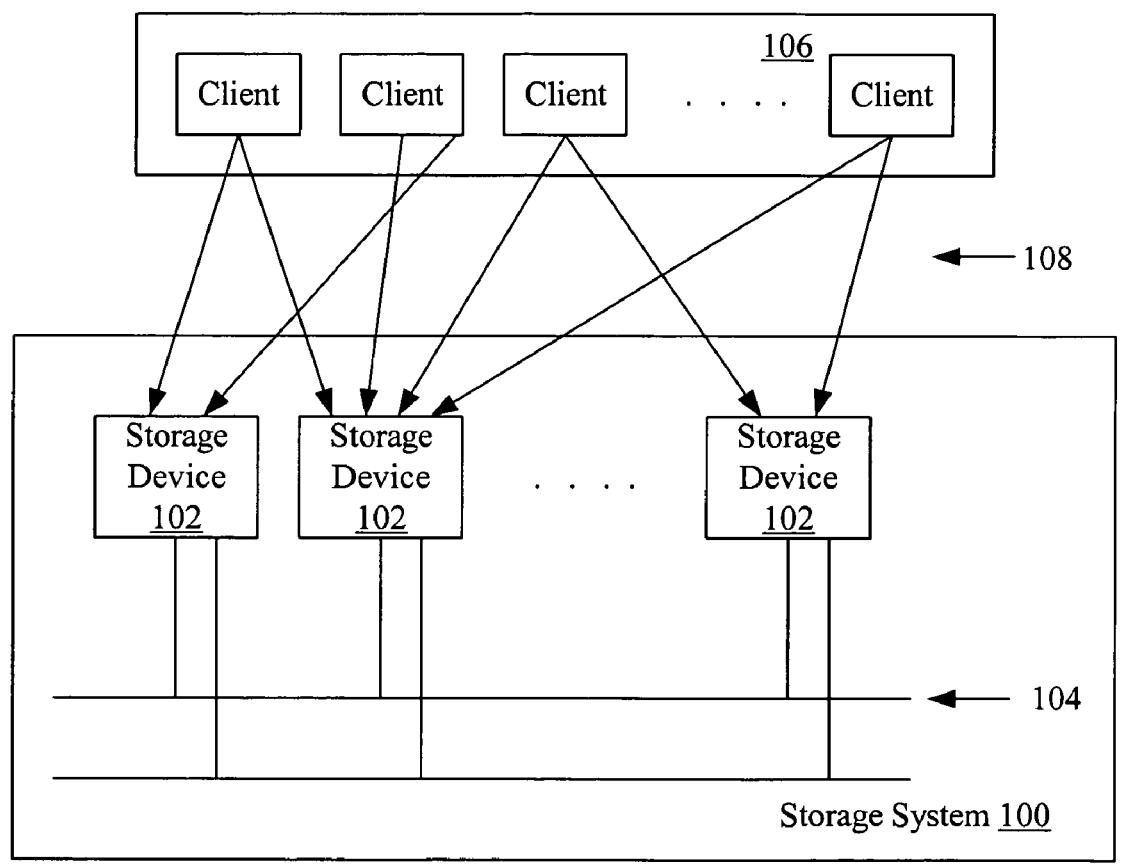
FIG. 1 illustrates an exemplary storage system including multiple redundant storage device nodes in which an embodiment of the present invention may be implemented.

FIG. 1 illustrates an exemplary storage system 100 including a plurality of storage devices 102 in accordance with an embodiment of the present invention. The storage devices 102 communicate with each other via a communication medium 104, such as a network (e.g., using Remote Direct Memory Access (RDMA) over Ethernet). One or more clients 106 (e.g., file servers) access the storage system 100 via a communication medium 108 for accessing data stored therein by performing read and write operations. The communication medium 108 may be implemented by direct or network connections using, for example, iSCSI over Ethernet, Fibre Channel, SCSI or Serial Attached SCSI protocols. While the communication media 104 and 108 are illustrated as being separate, they may be combined or connected to each other. The clients 106 may execute application software (e.g., email or database application) that generates data and/or requires access to the data.

Figure 2:
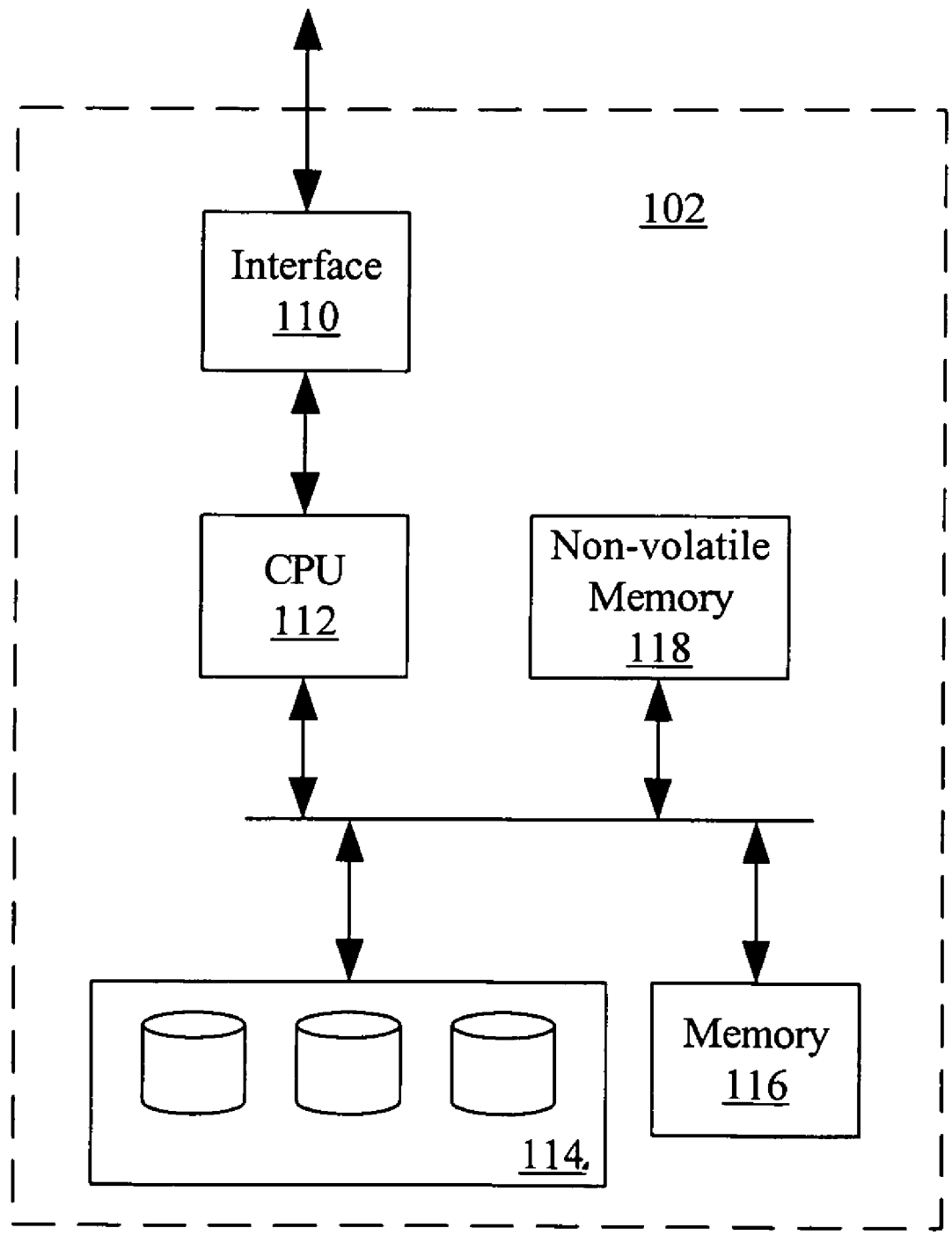
FIG. 2 illustrates an exemplary storage device for use in the storage system of FIG. 1 in accordance with an embodiment of the present invention.

FIG. 2 illustrates an exemplary storage device 102 for use in the storage system 100 of FIG. 1 in accordance with an embodiment of the present invention. As shown in FIG. 2, the storage device 102 may include a network interface 110, a central processing unit (CPU) 112, mass storage 114, such as one or more hard disks, memory 116, and preferably non-volatile memory 118 (e.g., NV-RAM). The interface 110 enables the storage device 102 to communicate with other devices 102 of the storage system 100 and with devices external to the storage system 100, such as the clients 106. The CPU 112 generally controls operation of the storage device 102. The memory 116 or 118 generally acts as a cache memory for temporarily storing data to be written to the mass storage 114 and data read from the mass storage 114. The memory 116 or 118 may also store timestamps and other information associated with the data, as explained more detail herein. Computer-readable media may be provided that stores computer code for controlling operation of the device 102.

Preferably, each storage device 102 is composed of off-the-shelf or commodity hardware so as to minimize cost. However, it is not necessary that each storage device 102 is identical to the others. For example, they may be composed of disparate parts and may differ in performance and/or storage capacity.

To provide fault tolerance, data is preferably stored redundantly within the storage system. For example, data may be replicated within the storage system 100. In an embodiment, data is divided into fixed-size segments. For each data segment, at least two different storage devices 102 in the system 100 are designated for storing replicas of the data, where the number of designated stored devices and, thus, the number of replicas, is given as "M." For a write operation, a new value for a segment is stored at a majority of the designated devices 102 (e.g., at least two devices 102 if M is two or three). For a read operation, the value stored in a majority of the designated devices is discovered and returned. The group of devices designated for storing a particular data segment is referred to herein as a segment group. Thus, in the case of replicated data, to ensure reliable and verifiable reads and writes, a majority of the devices in the segment group must participate in processing a request for the request to complete successfully. In reference to replicated data, the terms "quorum" and "majority" are used interchangeably herein.

As another example of storing data redundantly, data may be stored in accordance with erasure coding. For example, m, n Reed-Solomon erasure coding may be employed, where m and n are both positive integers such that m<n. In this case, a data segment may be divided into blocks which are striped across a group of devices that are designated for storing the data. Erasure coding stores m data blocks and p parity blocks across a set of n storage devices, where n=m+p. For each set of m data blocks that is striped across a set of m storage devices, a set of p parity blocks is stored on a set of p storage devices. An erasure coding technique for the array of independent storage devices uses a quorum approach to ensure that reliable and verifiable reads and writes occur. The quorum approach requires participation by at least a quorum of the n devices in processing a request for the request to complete successfully. The quorum is at least m+p/2 of the devices if p is even, and m+(p+1)/2 if p is odd. From the data blocks that meet the quorum condition, any m of the data or parity blocks can be used to reconstruct the m data blocks.

For coordinating actions among the designated storage devices 102, timestamps are employed. In one embodiment, a timestamp associated with each data or parity block at each storage device indicates the time at which the block was last updated (i.e. written to). In addition, a record is maintained of any pending updates to each of the blocks. This record may include another timestamp associated with each data or parity block that indicates a pending write operation. An update is pending when a write operation has been initiated, but not yet completed. Thus, for each block of data at each storage device, two timestamps may be maintained. The timestamps stored by a storage device are unique to that storage device.

For generating the timestamps, each storage device 102 includes a clock. This clock may either be a logic clock that reflects the inherent partial order of events in the system 100 or it may be a real-time clock that reflects "wall-clock" time at each device 102. Each timestamp preferably also has an associated identifier that is unique to each device 102 so as to be able to distinguish between otherwise identical timestamps. For example, each timestamp may include an eight-byte value that indicates the current time and a four-byte identifier that is unique to each device 102. If using real-time clocks, these clocks are preferably synchronized across the storage devices 102 so as to have approximately the same time, though they need not be precisely synchronized. Synchronization of the clocks may be performed by the storage devices 102 exchanging messages with each other or with a centralized server.

In particular, each storage device 102 designated for storing a particular data block stores a value for the data block, given as "val" herein. Also, for the data block, each storage device stores two timestamps, given as "ValTs" and "OrdTs." The timestamp ValTs indicates the time at which the data value was last updated at the storage device. The timestamp OrdTs indicates the time at which the last write operation was received. If a write operation to the data was initiated but not completed at the storage device, the timestamp OrdTs for the data is more recent than the timestamp ValTs. Otherwise, if there are no such pending write operations, the timestamp ValTs is greater than or equal to the timestamp OrdTs.

In an embodiment, any device may receive a read or write request from an application and may act as a coordinator for servicing the request. The coordinator need not be one of the storage devices 102. A write operation is performed in two phases for replicated data and for erasure coded data. In the first phase, a quorum of the devices in a segment group update their OrdTs timestamps to indicate a new ongoing update to the data. In the second phase, a quorum of the devices of the segment group update their data value, val, and their ValTs timestamp. For the write operation for erasure-coded data, the devices in a segment group may also log the updated value of their data or parity blocks without overwriting the old values until confirmation is received in an optional third phase that a quorum of the devices in the segment group have stored their new values.

A read request may be performed in one phase in which a quorum of the devices in the segment group return their timestamps, ValTs and OrdTs, and value, val to the coordinator. The request is successful when the timestamps OrdTs and ValTs returned by the quorum of devices are all identical. Otherwise, an incomplete past write is detected during a read operation and a recovery operation is performed. In an embodiment of the recovery operation for replicated data, the data value, val, with the most-recent timestamp among a quorum in the segment group is discovered and is stored at least a majority of the devices in the segment group. In an embodiment of the recovery operation for erasure-coded data, the logs for the segment group are examined to find the most-recent segment for which sufficient data is available to fully reconstruct the segment. This segment is then written to at least a quorum in the segment group.

Read, write and recovery operations which may be used for replicated data are described in U.S. patent application Ser. No. 10/440,548, filed May 16, 2003, and entitled, "Read, Write and Recovery Operations for Replicated Data," the entire contents of which are hereby incorporated by reference. Read, write and recovery operations which may be used for erasure-coded data are described in U.S. patent application Ser. No. 10/693,758, filed Oct. 23, 2003, and entitled, "Methods of Reading and Writing Data," the entire contents of which are hereby incorporated by reference.

Figures 3A, 3B, 3C:
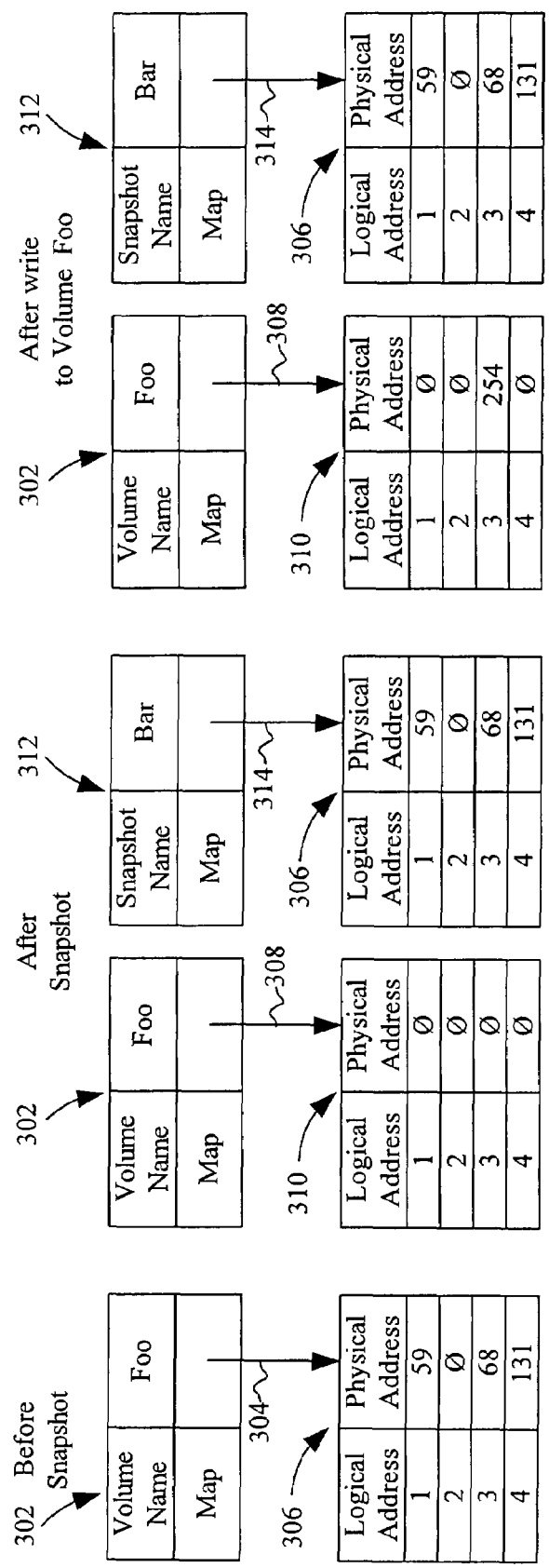
FIGS. 3A-3C illustrate volumes and storage map data structures before and after taking a snapshot in accordance with an embodiment of the present invention.

FIGS. 3A-3C illustrate data volumes and storage map data structures before and after taking a snapshot in accordance with an embodiment of the present invention. More particularly, FIG. 3A illustrates an exemplary data volume name 302, map pointer 304 and map 306 for the volume prior to taking a snapshot of the volume. A data volume is a collection of data blocks, which are typically created by a human operator or by an application. Each volume is assigned to be stored redundantly by a group of the storage devices 102. A volume may be distributed among a plurality of segment groups, so that each of the plurality of segment groups stores a portion of the volume.

There exist one or more versions of a volume. A version of a volume is a copy of the volume that reflects the updates to the volume up to a certain point in time. The current version of the volume reflects all the updates in the past and changes as new updates arrive. A snapshot version or snapshot of the volume reflects the updates up to the point in time when a corresponding snapshot operation is started. Each version has its own copy of data structures, such as names, maps, etc. The name of the current version is also referred to as the volume name, and the name of a snapshot version is called a snapshot name. Read and write operations are preferably allowed on all versions. Snapshot operations are allowed on the current version.

An exemplary volume and its current version have the name "Foo." The map pointer 304 is associated with the name "Foo" and points to the map 306. The map 306 comprises a data structure that includes a mapping of logical addresses to physical addresses. As shown in this example: logical address "1" corresponds to physical address "59"; logical address "2" is unallocated and thus, corresponds to a null physical address; logical address "3" corresponds to physical address "68"; and logical address "4" corresponds to physical address "131". The logical addresses represent references used by an application, while the physical addresses represent the physical locations (e.g., in storage devices 114) where corresponding data blocks for the current version are stored. More or fewer logical and physical addresses may be present in other examples.

FIG. 3B illustrates the volume "Foo" immediately after taking a snapshot. As shown in FIG. 3B, the current version name 302 is given a pointer 308 to a new map 310 (the new map may also be referred to as a tentative map), while a new version is created for the snapshot. The new version has a name 312, which in the example is "Bar," and a pointer 314 to the prior map 306. The map 306 contains the mapping of logical addresses to physical addresses that were current prior to taking the snapshot. The tentative map 310 is initially empty of physical addresses.

FIG. 3C illustrates the volume "Foo" after a write operation has occurred subsequent to the snapshot. Once the snapshot is taken, the map 306 is no longer the current map and instead it becomes the snapshot map. New writes are directed to the tentative map 310 which now represents the current version. As shown in FIG. 3C, when a new data block is written to the current version, a new physical block is allocated for the data and the map 310 is updated with the new logical address to physical address mapping. In this example, a new block has been written to logical address "3" and is located at physical address "254." When an existing block is written again in the current version, the data is overwritten in place and the map is not updated. Thus, if the data at logical address "3" is written to again prior to the next snapshot, the new data block will replace the data block at physical address "254" and no change will be made to the map 310.

The current version is linked to its most recent snapshot and each snapshot is linked to the prior snapshot. Retrieving a data block that was last updated prior to a snapshot requires using one or more of the links to locate the most-recent version of the data block. Referring to FIG. 3C, for example, if data at logical address "1" is read after the snapshot, this requires following a link from the current version "Foo" to the snapshot version "Bar" whose map indicates that the data is located at physical address "59."

Figure 4:
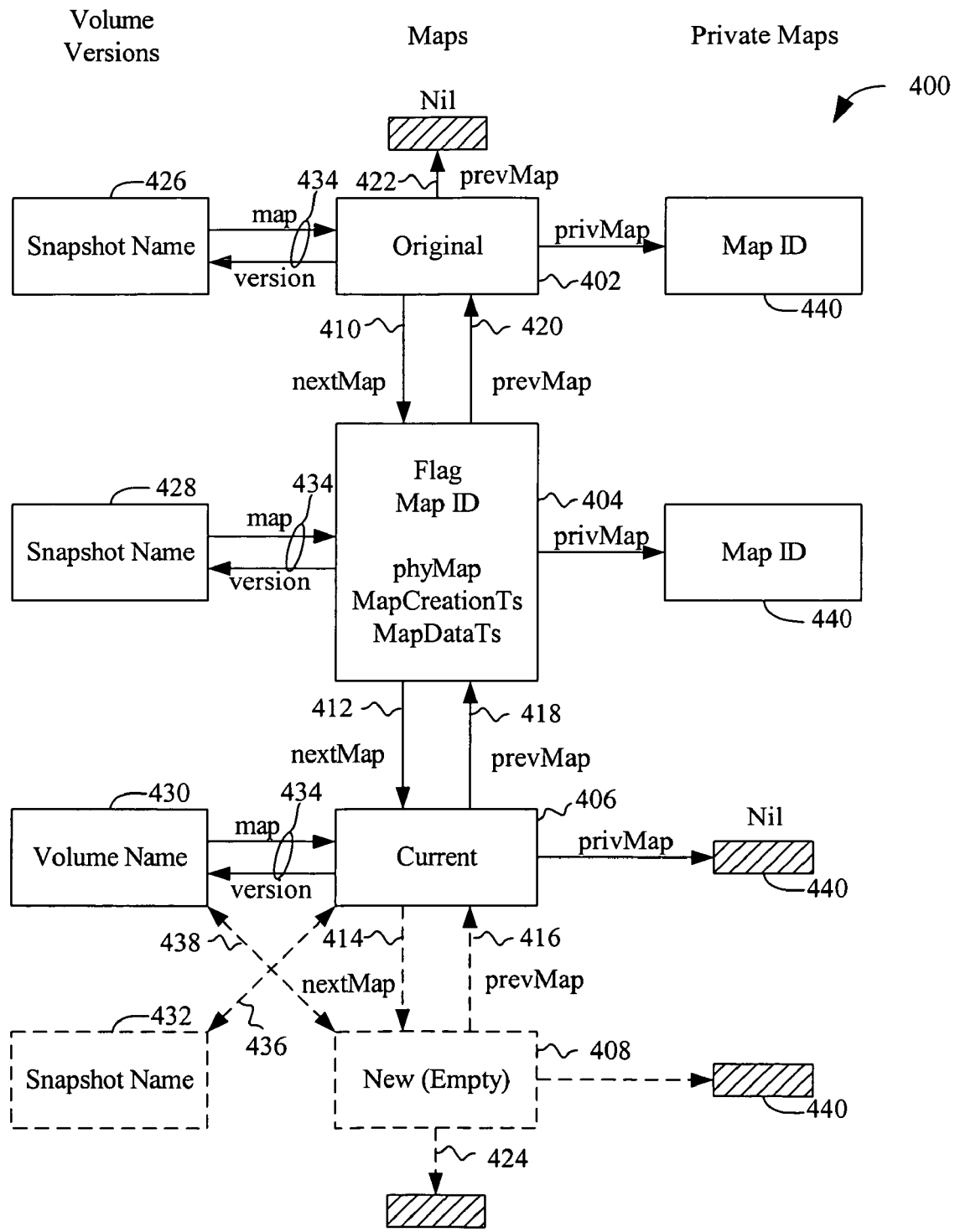
FIG. 4 illustrates linked-list data structure for volume maps in accordance with an embodiment of the present invention.

FIG. 4 illustrates linked-list data structure 400 for snapshot version mapping in accordance with an embodiment of the present invention. For each version of the volume, a map of logical to physical addresses is provided. The maps for the versions of the volume are preferably organized into the linked-list data structure 400. The data structure 400 is stored at each storage device 102 that stores any part of the volume.

Referring to FIG. 4, an original map 402, an intermediate map 404, a current map 406 and a new (i.e. tentative) map 408 are shown for a single volume. The original map 402 corresponds to the first snapshot taken after creation of the volume. The intermediate map 404 corresponds to snapshot taken after the first snapshot. As shown in FIG. 4, there is only one intermediate map 404 so it also corresponds to the most-recent completed snapshot. However, in other examples, there may be any number of intermediate maps 404, one of which corresponds to the most-recent completed snapshot. The current map 406 corresponds to the current version of the volume. Updates to the current map 406 for the volume are explained in reference to FIG. 3C. The tentative map 408 represents a next snapshot which has commenced but is not yet completed. When the snapshot is complete, the current map becomes the most-recent snapshot map and the tentative map becomes the current map.

A next map pointer ("nextMap" in FIG. 4) for each map points to the map which became the current map when the snapshot was completed. Thus, a pointer 410 points from the original map 402 to the intermediate map 404. Similarly, a pointer 412 points from the intermediate map 404 to the current map 406, and a pointer 414 points from the current map 406 to the tentative map 408. A previous map pointer ("prevMap" in FIG. 4) for each map points to the map which was the current map before the snapshot was completed. Thus, a pointer 416 points from the tentative map 408 to the current map 406. Similarly, a pointer 418 points from the current map 406 to the intermediate map 404, and a pointer 420 points from the intermediate map 404 to the original map 402. A previous map pointer 422 for the original map 402 is null as is a next map pointer 424 for the tentative map 408. The next map and previous map pointers link the maps together. They are used to determine the correct logical and physical address locations of the requested data for read operations and to reconstruct the data at a point-in-time, as appropriate.

Each version has a corresponding identifier or name. As shown in FIG. 4, the original map 402 corresponds to snapshot name 426, the intermediate map 404 corresponds to snapshot name 428, the current map 406 corresponds to version name 430, and the new snapshot 408 corresponds to snapshot name 432. Name pointers 434 ("map" and "version" in FIG. 4) connect the names to the corresponding map. A dashed pointer 436 indicates the name pointer that will connect the snapshot name 432 for the next snapshot to the current map 406 when the next snapshot is taken (so that the current map 406 becomes a snapshot map). Similarly, a dashed pointer 438 indicates the name pointer that will connect the current version name 430 to the tentative map 408 when the next snapshot is taken (so that the tentative map 408 becomes the current map).

As mentioned, when a new data block is written to the current version, a new physical block is allocated for the data and the current map 406 is updated with the new logical to physical address mapping. When an existing block is written in the current version, the data is overwritten in place and the map 406 is not updated.

The map of a snapshot may have an optional private map pointer ("privMap" in FIG. 4) which points to a private map 440 that contains physical address locations of data that is associated with the snapshot but is written after the snapshot was created. When a block is written to a snapshot of a volume for a first time after the snapshot is created, a new physical block is allocated for the new data and the private map 408 is updated with the new mapping; when the block is written for a second time, the data is overwritten in the location already recorded in the private map 408 and the private map is not updated 408. Private maps for the current map 406 and the tentative map 408 are empty.

The map for each version of the volume may include a flag, a map ID, a physical map pointer ("phyMap" in FIG. 4), and timestamps, MapCreationTs and MapDataTs. The flag indicates the state of the map, which may be "current," indicating that the map is the current map, "snapshot," indicating that the map is for a snapshot, "tentative," indicating that the map is newly created and not committed, "snapping," indicating that the map is in the process of being snapshot, or another state.

The physical map pointer ("phyMap") points to a data structure that contains the mapping of logical addresses to physical addresses. The timestamp MapCreationTs indicates the creation time of the volume for the original version, or the start time of the corresponding snapshot operation for later versions of the volume. The timestamp MapDataTs indicates the last time that any data belonging to the map was updated or prepared for update. The timestamp MapDataTs for a map at a storage device 102 may be determined to be the newest timestamp among the timestamps ValTs and OrdTs for all of the data blocks on the storage device 102 and belonging to the map.

Figure 5:
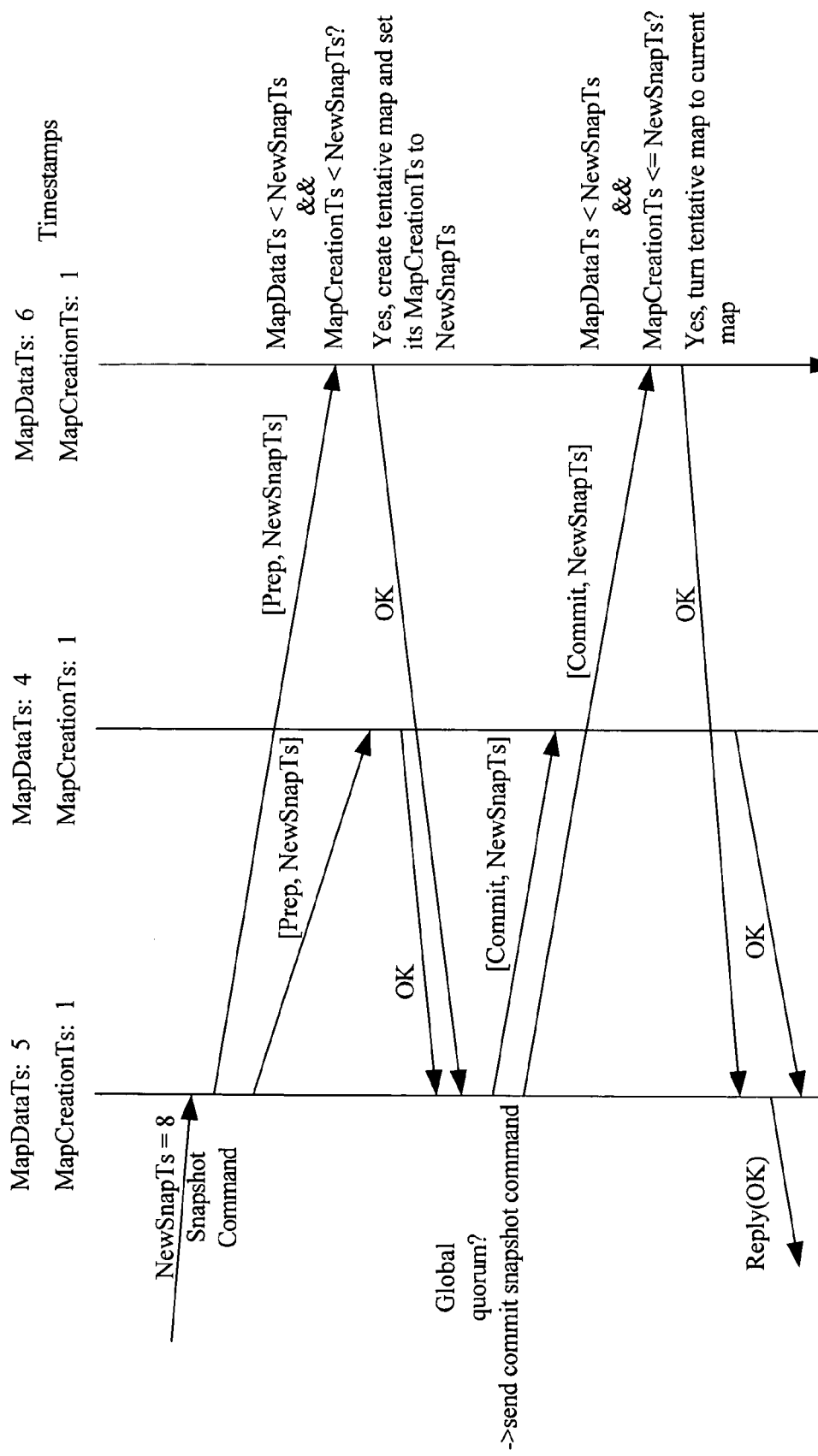
FIG. 5 illustrates a timing diagram for creation of a snapshot in accordance with an embodiment of the present invention.

FIG. 5 illustrates a timing diagram for creation of a snapshot in accordance with an embodiment of the present invention. In FIG. 5, each vertical line represents one of the storage devices 102. Time is shown increasing from the top of the diagram to the bottom. The timestamps MapDataTs and MapCreationTs shown on the top of the figure are for the current version of the volume, and the timestamps referenced on the right side of the figure are for the newest version of the volume, i.e., the current version in a first phase of the snapshot operation and the tentative version in a second phase.

As mentioned, the snapshot operation is performed in two phases. In a first phase, a coordinator sends a "create snapshot" command with a new timestamp NewSnapTs to the storage devices 102 for the volume being snapshot. Each device responds to the create snapshot command by determining if it is in a condition to execute the command, and if so, it creates a new empty map data structure that is linked to the current map, identified by its flag as "tentative," and a snapshot name. The current map is identified by its flag as "snapping."

Figure 6:
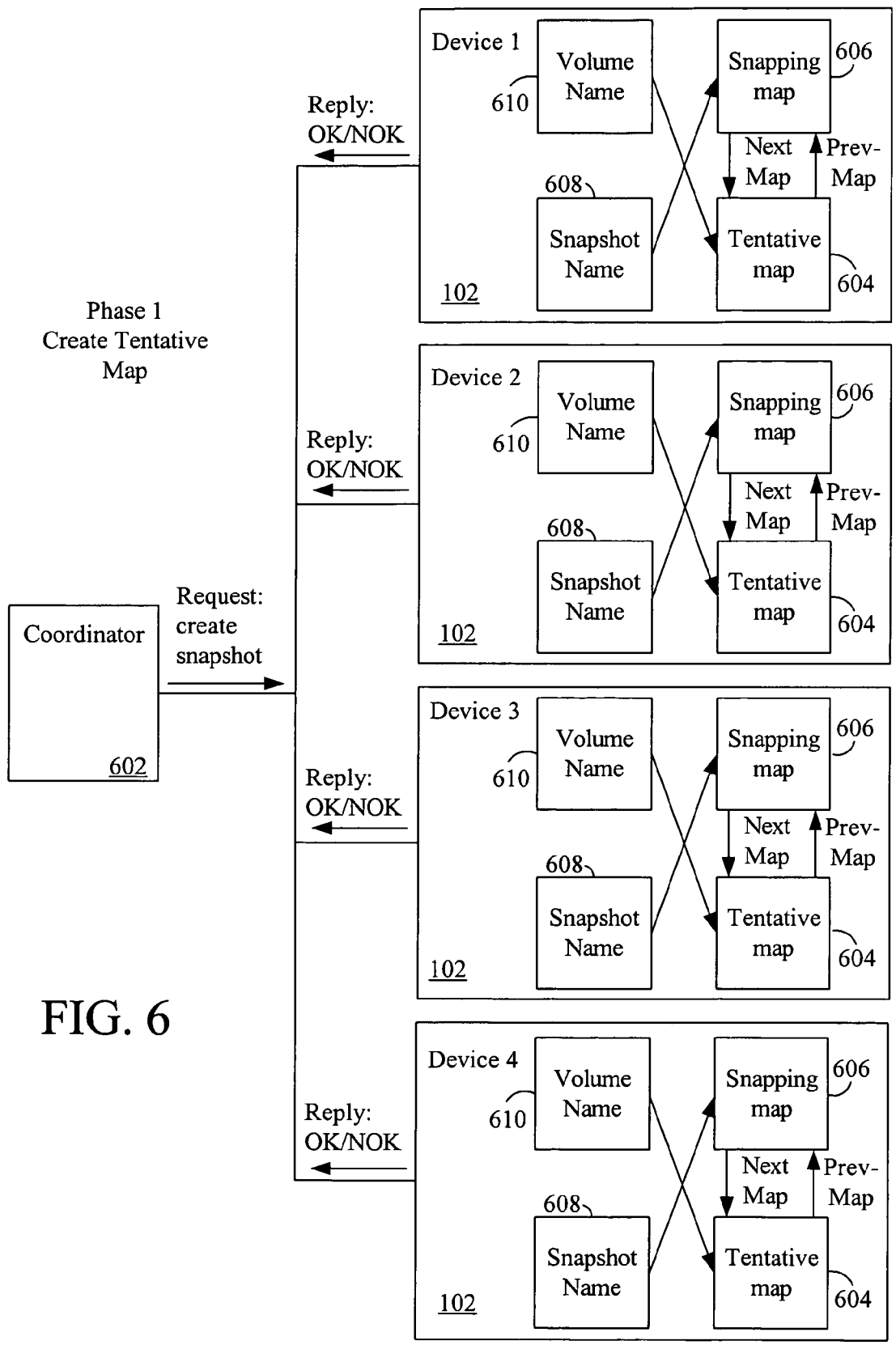
FIG. 6 illustrates a first "prepare snapshot" phase of snapshot creation in accordance with an embodiment of the present invention.

FIG. 6 illustrates a first "prepare snapshot" phase of snapshot creation in accordance with an embodiment of the present invention. As shown in FIG. 6, a coordinator 602 sends the prepare snapshot command to the devices 102. While four devices are shown in FIG. 6, it will be apparent that more or fewer devices may participate in the snapshot. FIG. 6 shows that in response to the prepare snapshot command, each of the devices 102 creates a new empty map data structure 604 that is linked to its volume name 610 and a new snapshot name data structure 608 that points to the current map 606.

For each device 102, determining whether it in a condition to execute the command may include determining that there is no other more recent snapshot on the volume that has started. As shown in FIG. 5, this may be accomplished by comparing the timestamp NewSnapTs received from the coordinator to the timestamp MapCreationTs for the current version of the volume. If the timestamp MapCreationTs is less than (i.e. older) the timestamp NewSnapTs, this indicates that there is not a more recent snapshot to the volume prepared or committed at the device 102. Determining whether the device is in a condition to execute the command may also include determining that there is no write operations on data in the volume that are more recent than the snapshot operation. This may be accomplished by comparing the timestamp NewSnapTs received from the coordinator to the timestamp MapDataTs for the current version. If the timestamp MapDataTs is less than (i.e. older) the timestamp NewSnapTs, this indicates that there is not a more recent write operation to the current version completed or underway at the device.

If both of these conditions are true, the device 102 then creates the tentative map. The tentative map has its timestamp MapCreationTs equal to the value of the received timestamp NewSnapTs and its timestamp MapDataTs equal to the value of the timestamp MapDataTs of the current map. The device also sends an affirmative response ("OK" in FIGS. 5 and 6) to the coordinator 602. The snapshot preparation is completed thus far. Otherwise, if a device is not capable of executing the prepare snapshot command, the device sends a negative response ("NOK" in FIG. 6) to the coordinator 602.

This completes the first phase. Any write operations with a timestamp (OrdTs) older than NewSnapTs received before the start of the snapshot operation result in updates to the old map 606. Any write operations with a timestamp (OrdTs) newer than NewSnapTs result in updates to the tentative map 604 (FIG. 6). Thus, there is no need to suspend data operations that occur during the snapshot process. By checking the timestamp NewSnapTs received from the coordinator 602 at each device 102 during the snapshot process, this ensures that the snapshot creation is serialized with all writes to the volume.

Though not necessary, the coordinator 602 may be one of the storage devices 102 that store a portion of the volume, in which case, the coordinator 602 also performs the steps of creating a snapshot of its data volume. If the system 100 stores multiple volumes, all of the volumes may be snapshot simultaneously or they may be snapshot at different times.

If the coordinator receives a "global quorum" of affirmative replies in the first phase, it initiates the second phase by sending a "commit snapshot" command to the devices 102. A global quorum is a quorum in every segment group assigned to the volume.

Figure 7:
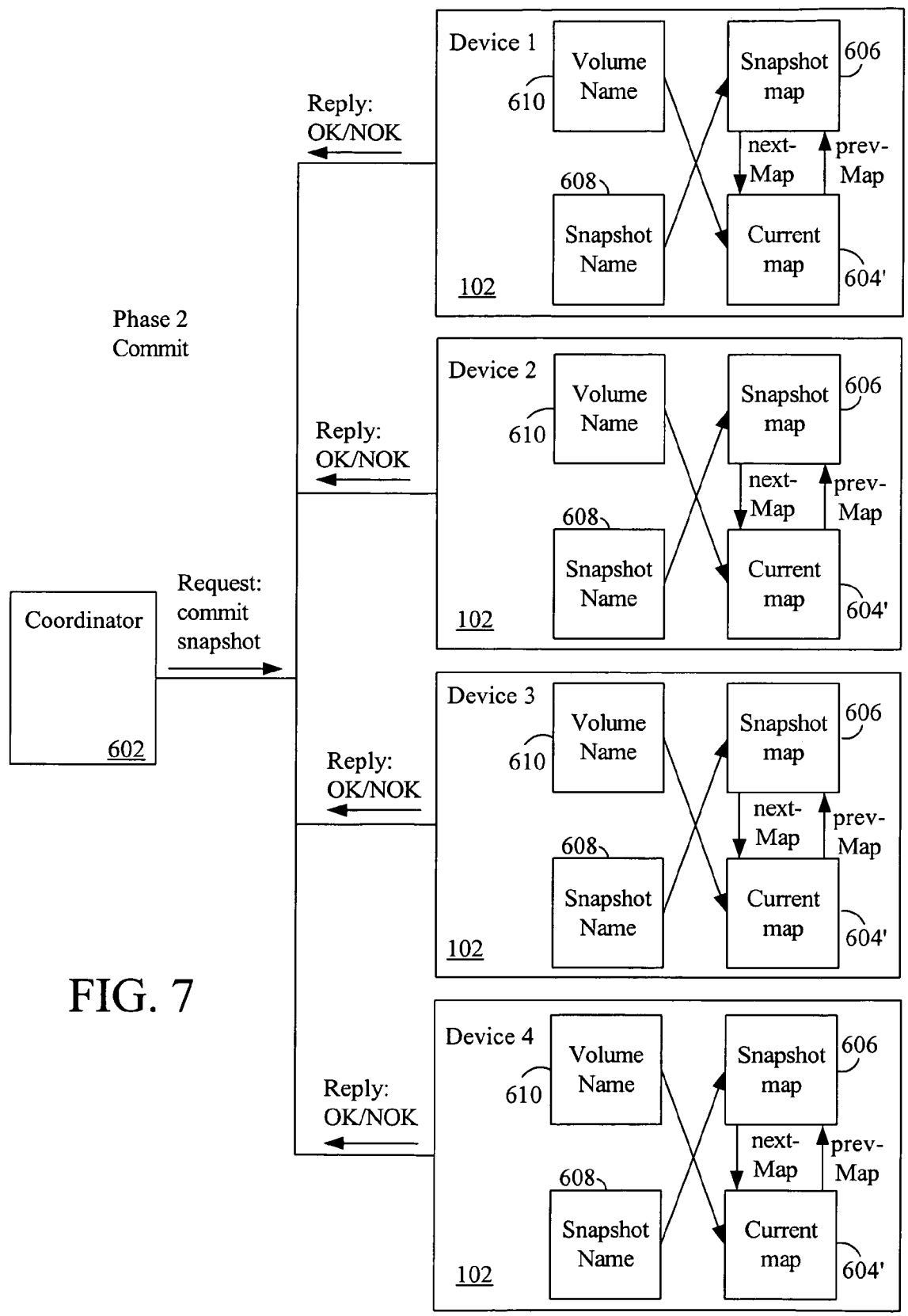
FIG. 7 illustrates a second "commit" phase of snapshot creation in accordance with an embodiment of the present invention.

FIG. 7 illustrates a second "commit" phase of snapshot creation in accordance with an embodiment of the present invention. Each device responds to the commit snapshot command by changing the flag of its current map from snapping to snapshot and by changing the flag of the tentative map from tentative to current. As a result, the snapshot map 606 is prevented from being altered by any new writes to the volume and, instead, new writes are directed to the current map 604', which is empty until a write is received. As shown in FIG. 7, the volume name 610 points to the tentative map 604'.

Referring to FIG. 5, the commit snapshot command may be accompanied by the same timestamp NewSnapTs which was sent with the prepare snapshot command in the first phase. In response, the devices 102 may compare the received value of this timestamp to their locally stored value. If they match, this indicates that the commit snapshot command corresponds to the prepare snapshot command previously received. In this case, the devices 102 send an affirmative response ("OK" in FIGS. 5 and 7) and reset their map flags as described above. Otherwise, the devices 102 send a negative response ("NOK" in FIG. 7) and retain their map data structure for the volume until a commit snapshot command with the correct timestamp is received or an "abort snapshot" command is received.

Figure 8:
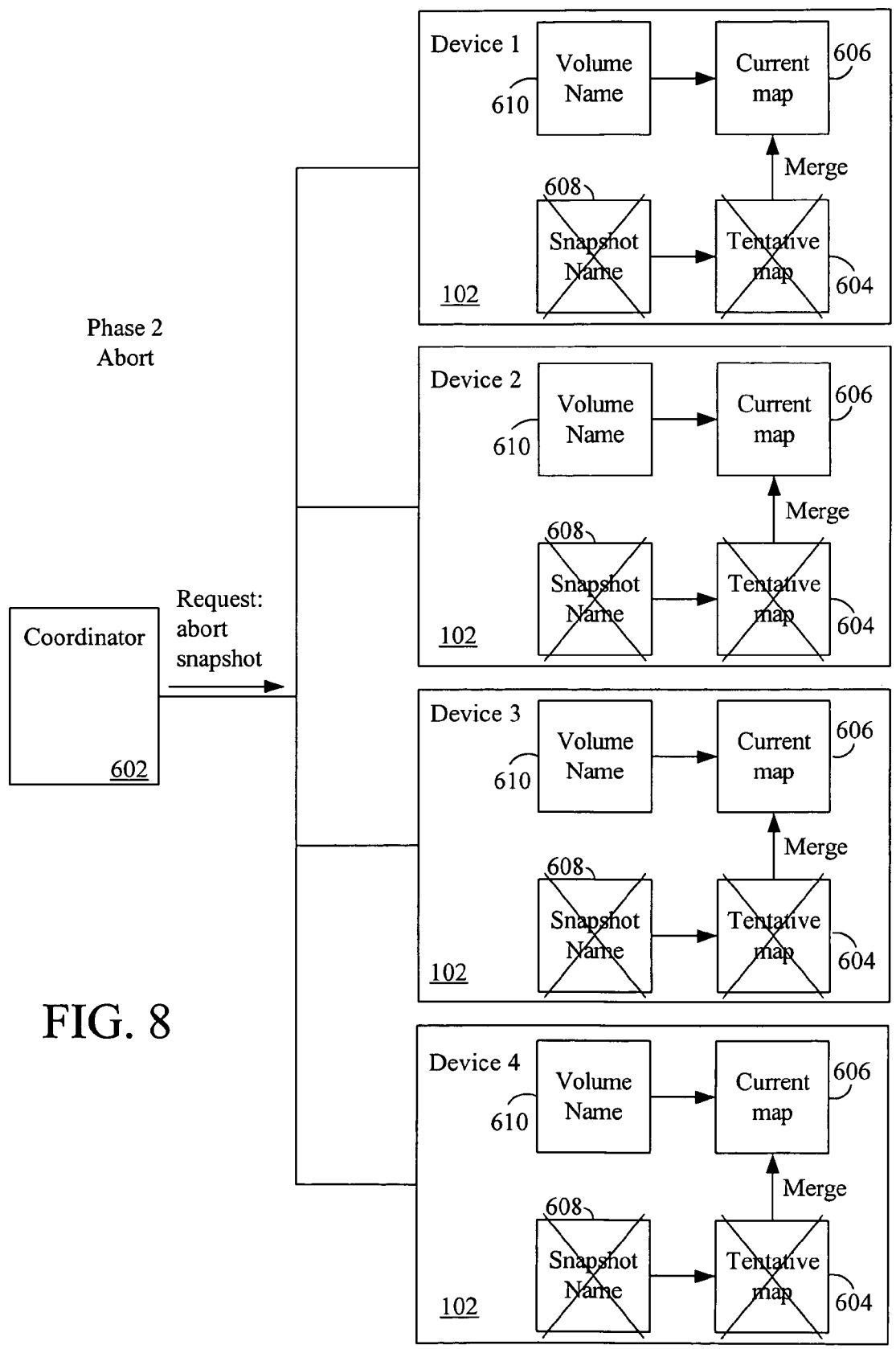
FIG. 8 illustrates a second "abort" phase of snapshot creation in accordance with an embodiment of the present invention.

If the coordinator does not receive a global quorum of affirmative replies in the first phase, it sends an "abort snapshot" command to the devices 102 in the second phase. FIG. 8 illustrates a second "abort" phase of snapshot creation in accordance with an embodiment of the present invention. In response to the abort snapshot command, the devices 102 merge any entries in the tentative map 604 (FIGS. 6 and 8) into the current map 606, change the flag for the current map 606 from snapping to current and point the volume name 610 to the current map 606. The snapshot name 608 and the tentative map 604 may then be deleted or ignored. This returns the map data structure 400 for the device 102 to the condition it would have been in had the snapshot not been attempted.

In the event that the timestamp NewSnapTs is older than some of the timestamps associated with data blocks, the snapshot operation needs to be aborted to ensure serializability for the snapshot. The timestamp NewSnapTs being older than some of the timestamps associated with data blocks may result from clock skews and/or network delays. To avoid repeatedly aborting the snapshot creation process due to these causes, the coordinator may retry the snapshot using a timestamp NewSnapTs that is set to a time in future (e.g., a few seconds in the future). The value of this timestamp may be determined by adding to a present time an adjustment period of at least the difference in time between the timestamp of an aborted snapshot and the newest timestamp associated with the data that causes the abort. An estimate of network delay may be added as well. This value of this adjustment period may be saved by the coordinator for future use and may be tuned based on the frequency of snapshot abortions. For example, if snapshot abortions occur frequently, the adjustment may be increased, and if abortions occur infrequently, the adjustment period may be decreased.

Figure 9:
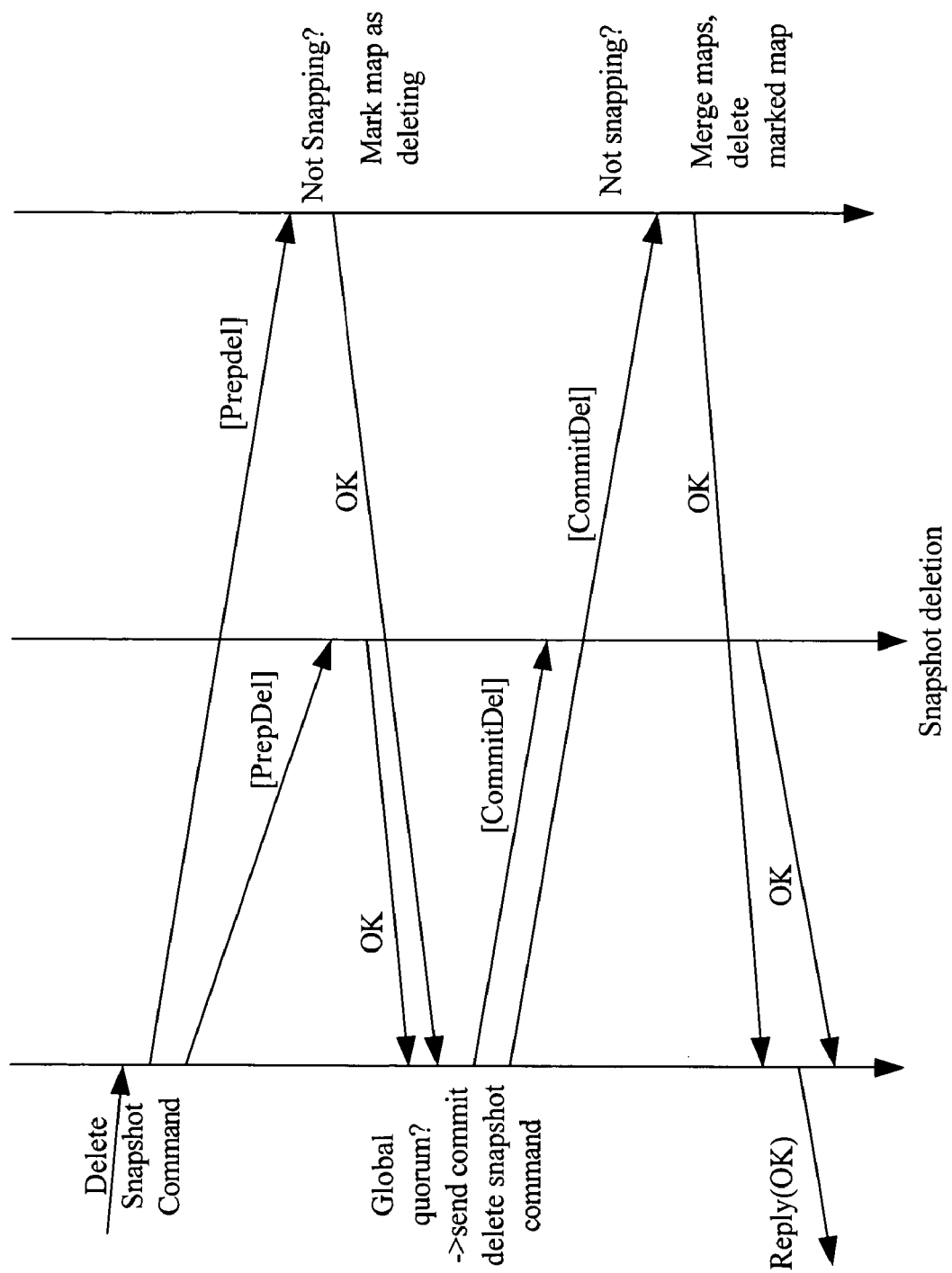
FIG. 9 illustrates a timing diagram for deletion of a snapshot in accordance with an embodiment of the present invention.

FIG. 9 illustrates a timing diagram for deletion of a snapshot in accordance with an embodiment of the present invention. A snapshot may be deleted, for example, when it is no longer needed.

Snapshot deletion is also performed in two phases. In a first phase, a coordinator sends a "prepare to delete snapshot" command to the storage devices 102 for the volume whose snapshot is being deleted along with an identification (e.g., the name) of the snapshot to be deleted. Each device responds to the prepare to delete snapshot command by checking the "snapping" flag for its local map of the snapshot to be deleted. If it is not set, the device sets a "deleting" flag for the map and returns an affirmative response ("OK" in FIG. 9) to the coordinator. Otherwise, if the snapping flag is set, the device returns a negative response (i.e., "NOK").

If the coordinator receives a global quorum of "OK" replies, it initiates the second phase by sending a "commit delete snapshot" command to the devices 102. In response to the commit delete snapshot command, each device merges the content of its snapshot map to be deleted (excluding its private map) into its next map and removes the deleted map from the linked list 400. The merge operation retains newer physical address map entries and assigns them to the corresponding logical address and deletes older physical map entries. Thus, the most-recent data values among the deleted snapshot and the next most recent snapshot are merged into a single map. The next map and previous map pointers of the remaining maps immediately on either side of the deleted map in the linked list 400 are reset so that they point at each other.

Optionally for the delete operation, the physical locations of the data for the deleted snapshot may be overwritten with the data in the next version of the volume, so that all data for the volume will be stored in its original physical locations, overwriting the previous versions of data, as though the deleted snapshot had not been created. Because this process could take a considerable amount of time, it may be performed in the background of other operations.

If a global quorum of "OK" responses is not received in the first phase of the delete snapshot operation, the coordinator sends an "abort delete snapshot" command in the second phase. In response to the abort delete snapshot command, each device 102 change the flag for the map from deleting to current.

Figure 10:
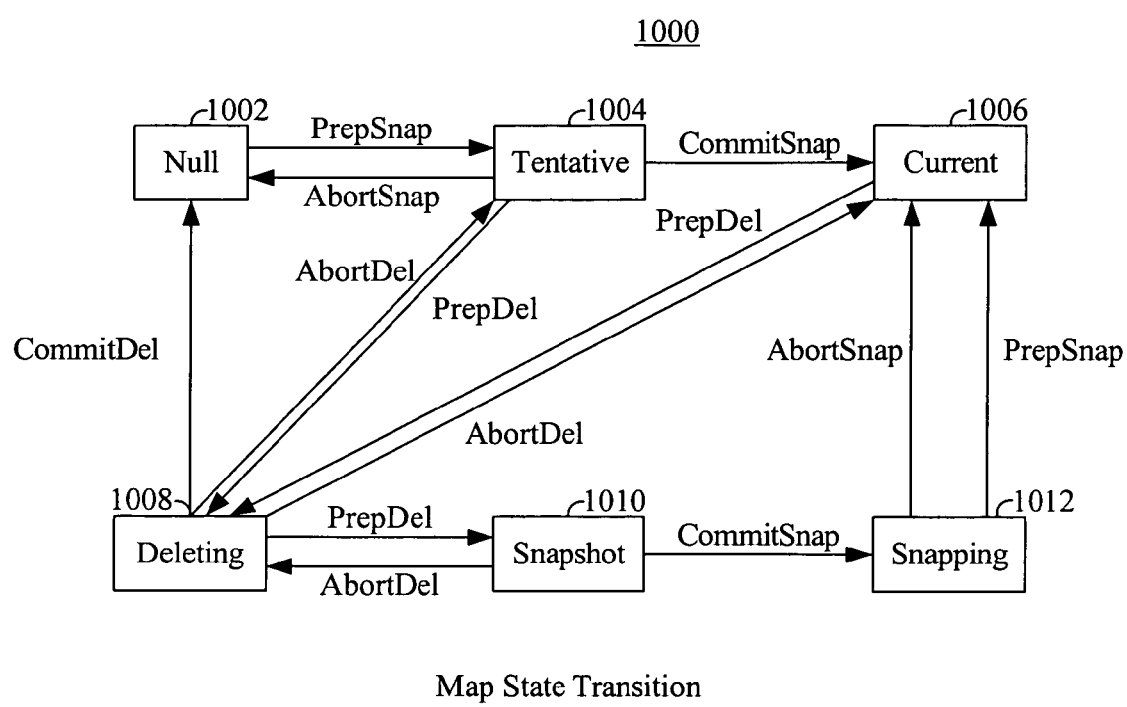
FIG. 10 illustrates a state diagram for storage map in accordance with an embodiment of the present invention.

FIG. 10 illustrates a state diagram 1000 for a storage map in accordance with an embodiment of the present invention. As shown in FIG. 10, there may be six states of a map, including a "null" state 1002, a "tentative" state 1004, a "current" state 1006, a "deleting" state 1008, a "snapshot" state 1010 and a "snapping" state 1012. At any given time, a map is in one of these states. As mentioned, each map may have a flag that identifies the state that the map is in. The null state 1002 indicates that the device does not have any local information about the map or the corresponding snapshot. The tentative state 1004 indicates that the map is newly created and not committed. The current state 1006 indicates that the map represents the current version of the volume. The deleting state 1008 indicates that the map is prepared for deletion though not yet deleted. The snapshot state 1010 indicates that the map represents a successfully created snapshot. The snapping state 1012 indicates that the map is in the process of being snapshot.

A client can access snapshot information for a volume by contacting the devices 102 for the volume. Based on the replies, the client can determine whether the snapshot is valid, and if it is, the client may use the snapshot information obtained from one of the devices 102 that participated in the valid snapshot for retrieving the data that corresponds to the snapshot. A snapshot may be considered valid if it has been successfully prepared for creation and has not been successfully prepared for deletion. This can be determined by contacting a global quorum of the devices. In a preferred embodiment, however, a client needs only to contact devices of a segment group, rather than all of the devices for the volume, to determine whether a snapshot is valid. A snapshot may be considered valid based on information obtained from a segment group as follows: if there exists at least one device that has the map for the snapshot in a non-tentative state and there exists a quorum in a segment group that have the map for the snapshot in a non-null and non-deleting state, then the snapshot is valid. It follows from this that the first phase of snapshot creation succeeded and the first phase of snapshot deletion failed or was not attempted. Conversely, if there exists a local quorum of devices that have the map for the snapshot in a null state, the snapshot is invalid (e.g., the first phase of snapshot creation failed or was not started).

To read this information for a snapshot, a coordinator for this operation may send a "probe snapshot" command to each device in a segment group, which may or may not include the coordinator. Each device in the segment group replies with its local information, including the flags which indicate the state of its local map for the snapshot. If the coordinator cannot determine the validity from the replies of the segment group, it may then attempt to contact all of the devices that store any portion of the volume by sending the probe snapshot command to them. The coordinator then attempts to determine whether the snapshot is valid from the global replies. If the coordinator succeeds, it may then attempt to contact every accessible device for performing a recovery operation. The recovery operation may includes sending an enforcement command which may be the commit snapshot command, the abort snapshot command, the commit delete snapshot command, the abort delete snapshot command or a combination thereof.

To access data in a version of the volume for performing read, write and recovery operations, the physical address for the data needs to be determined from the mapping data structure 400. This generally requires following the linked list to locate the snapshot for the data having the most recent version of the data (i.e. the snapshot for which the data has not since been written). Thus, is an implicit read operation on the snapshot information is performed for each read, write and recovery operation on data. This may be accomplished by simultaneously sending a probe snapshot command to the devices 102 of a segment group when a read, write or recovery operation is commenced. The probe snapshot command may be combined with the first command for the operation.

In the first phase of a write or recovery operation, a timestamp NewTs for the write or recovery operation may be compared to the timestamps MapCreationTs for the volume 430 (FIG. 4) at each device 102 in a segment group. The newest version of the volume whose MapCreationTs is older than NewTs is selected as the destination for the write or recovery operation. If such a destination is found and the timestamps ValTs and OrdTs for the data in the destination map are older than NewTs, the device returns an "OK" response and the destination map ID to the coordinator.

In the second phase of the write or recovery operation, the data will be committed in the destination map as selected in the first phase.

Assume that a snapshot on a volume is created at a time $t_1$ using a timestamp of $t_2$, where $t_1 < t_2$. For example, a write operation may occur at a time $t_3$, where $t_1 < t_3 < t_2$. Writes that occur during the interval between $t_1$ and $t_2$ may be directed to the snapshot. However, if a read operation is performed on the snapshot and then a write is performed on the snapshot, the read operation will be incorrect since the snapshot will have changed after the read. In other words, read operations should only be directed to a snapshot after all of the writes for the snapshot have been performed. Thus, in an embodiment, read operations are disallowed unless the timestamp for the read operation is greater than the timestamp for the snapshot. Thus, in the example, a read operation having a timestamp of $t_4$ is disallowed unless $t_2 < t_4$. Once such a read occurs on a block of data in the snapshot, each device in the segment group for the block may update its timestamp ValTs for the data to be equal to $t_2$. Thus, any write operation attempted after such a read operation, but with a timestamp older than $t_2$, will be aborted rather than redirected to the snapshot (and any write operations with a timestamp newer than $t_2$ will be directed to the current version). Thus, no further writes to a block in a snapshot are allowed after the first successful read.

In an alternative embodiment, write operations that overlap with a snapshot creation are logged. In this embodiment, snapshot creation is performed in two-phases, as before. However, in a first phase, the coordinator for the snapshot process sends a prepare snapshot command (which can be without a timestamp) to all of the devices 102 for the volume being snapshot. Upon receiving this command, each device starts to process each received write request by appending the new data to a persistent log rather than updating the data in place. Each device also responds to the prepare snapshot command by returning to the coordinator the newest timestamp of data in the volume that was previously updated in place. If the coordinator receives a global quorum of replies, it initiates a second phase by sending a commit snapshot command to all of the devices for the volume along with the newest timestamp among those received with the replies. This newest timestamp becomes the timestamp for the snapshot. In response, each device moves the data in its log having timestamps older than the snapshot timestamp to the prior map (i.e. the snapshot map), creates a new map data structure for the current volume, moves the remaining data in the log to the new map and terminates appending writes to the log.

Otherwise, if a global quorum of replies is not received in the first phase, the coordinator sends an abort snapshot command to the devices 102 for the volume in the second phase. In response to the abort snapshot command, each device moves the data in its log to its current map and terminates appending writes to the log (any new writes are directed to the current map).

In the event a device 102 does not receive the commit snapshot command or the abort snapshot command in the second phase, this could result in the device continuing to append new writes to the log indefinitely. To prevent this, each device preferably only appends new writes to the log for a predetermined period of time. In the event that the period of time expires before the device receives the commit snapshot command or the abort snapshot command in the second phase, then a timeout occurs in which the device aborts the snapshot just as though the device had received the abort snapshot command. Thus, when the timeout occurs, the device moves the data in its log to its current map and terminates appending writes to the log (any new writes are directed to the current map).

While the foregoing has been with reference to particular embodiments of the invention, it will be appreciated by those skilled in the art that changes in these embodiments may be made without departing from the principles and spirit of the invention, the scope of which is defined by the following claims. For example, while in the preferred embodiment, the data of the volume is stored redundantly, which may be by being replicated or erasure-coded, it is not necessary that the volume is stored redundantly in the system. For example, a single copy of volume and its snapshots may be distributed among the storage devices.

What is claimed is:

1. A method of taking a snapshot of data comprising:
   obtaining a first map data structure that specifies a relationship of logical addresses to physical addresses for a plurality of data blocks of a volume, the first map data structure initially being identified as a current map for the volume;
   forming a second map data structure that is initially empty, the second map data structure initially being identified as a tentative map data structure for the volume;
   committing the snapshot by identifying the second map data structure as the current map for the volume and identifying the first map data structure as a snapshot for the volume;
   taking one or more additional snapshots by repeating said steps of forming and committing for each additional snapshot, each snapshot being completed upon being committed and the snapshots being linked such that each snapshot is linked to a next most-recent snapshot; and
   performing writes to data blocks of the volume while taking the one or more additional snapshots by writing a data block to a new physical location and updating the map identified as the current map at the time of the write with a physical address of the data block being written, wherein each committed snapshot only contains values corresponding to the physical addresses of the data blocks of the volume that were written to while the map data structure for the snapshot was identified as the current map.

2. The method according to claim 1, further comprising overwriting the data in place without updating the second data structure when a data block is updated again in response to a write.

3. The method according to claim 1, wherein the volume is distributed among a plurality of storage devices and wherein said steps of forming and committing are performed at sufficient ones of the plurality of the storage devices that the snapshot can be reconstructed.

4. The method according to claim 3, wherein the volume is distributed and replicated among the plurality of storage devices.

5. A method of taking a snapshot of a data distributed among a plurality of data storage devices, the plurality of data storage devices redundantly storing the data and each having a map data structure that specifies a relationship of logical addresses to physical addresses for a plurality of blocks of the data, the method comprising:
   forming new map data structures by at least a quorum but not necessarily all of the storage devices, each new map data structure initially being empty of physical addresses and initially being identified as a tentative map data structure; and
   committing the snapshot by at least a quorum but not necessarily all of the storage devices by identifying the map data structures as snapshot maps for the data and identifying the new map data structures as current maps for the data.

6. The method according to claim 5, further comprising inserting a new physical address into the new data structures when a data block is updated by a new version of the data, the new version of the data being stored at the new physical address.

7. The method according to claim 6, further comprising overwriting the new version of the data in place without updating the new data structure when the data block is updated again.

8. The method according to claim 5, further comprising taking one or more additional snapshots by repeating said steps of forming a and committing for each additional snapshot.

9. The method according to claim 5, wherein the data is replicated.

10. The method according to claim 5, wherein the data is erasure coded.

11. The method according to claim 5, the plurality of data storage devices being a group of devices designated for redundantly storing at least a portion of a data volume and wherein one or more additional groups of storage devices are each designated for storing a corresponding portion of the data volume and the quorum comprising a quorum but not necessarily all of each of the groups of the devices.

12. The method according to claim 5, said forming comprising sending a first command and wherein each storage device that successfully forms its new map data structure in response to the first command returns an affirmative response.

13. The method according to claim 12, said committing being performed in response to receiving affirmative responses from the quorum.

14. The method according to claim 13, said committing comprising sending a second command and said committing is performed by the storage devices in response to the second command.

15. A method of taking a snapshot of a data distributed among a plurality of data storage devices, the plurality of data storage devices redundantly storing the data and each having a map data structure That specifies a relationship of logical addresses to physical addresses for a plurality of blocks of the data, the method comprising:
   sending a first command to the plurality of storage devices instructing the snapshot of the data to be prepared;
   receiving any affirmative responses from the plurality of storage devices, each affirmative response indicating that the corresponding storage device is able to form a new map data structure, the new map data structure initially being empty of physical addresses; and
   sending a second command to the plurality of storage devices, the second command instructing the snapshot to be committed if a quorum of affirmative responses is received, but not necessarily a response from each of the plurality of storage devices being received, and the second command instructing the snapshot to be aborted if the quorum of affirmative responses is not received.

16. The method according to claim 15, further comprising inserting a new physical address into the new data structures when a data block is updated by a new version of the data, the new version of the data being stored at the new physical address.

17. The method according to claim 16, further comprising overwriting the new version of the data in place without updating the new data structure when the data block is updated again.

18. The method according to claim 15, further comprising taking one or more additional snapshots by repeating said steps of sending the first command, receiving any responses and sending the second command for each additional snapshot.

19. The method according to claim 15, wherein the data is replicated.

20. The method according to claim 15, wherein the data is erasure coded.

21. The method according to claim 15, the plurality of data storage devices being a group of devices designated for redundantly storing at least a portion of a data volume and wherein one or more additional groups of storage devices are each designated for storing a corresponding portion of the data volume and the quorum comprising a quorum of each of the groups of the devices.

22. The method-according to claim 15, the map data structure for each storage device initially being identified as a current map for the data and the new map data structure for each storage device initially being identified as a tentative map data structure.

23. The method according to claim 22, wherein in response to being instructed to commit the snapshot, each storage device identifies its map data structure as the snapshot map for the data and identifies the new map data structure as its current map for the data.

24. The method according to claim 22, wherein write operations are directed to the tentative map for the data after the first command is received and before the snapshot is committed or aborted and, otherwise, the write operations are directed to the current map for the data.

25. The method according to claim 22, wherein in response to being instructed to abort the snapshot, each storage device merges any write operations in its tentative map for the data into its current map for the data and deletes or ignores its tentative map.

26. The method according to claim 22, wherein a timestamp for the snapshot is associated with the first command and each storage device has information that indicates the last time that a snapshot was started on the volume and the last time that any data corresponding to the current map was updated or prepared for update.

27. A method of taking a snapshot of data distributed among a plurality of data storage devices, the plurality of data storage devices redundantly storing the data and each having a map data structure that specifies a relationship of logical addresses to physical addresses for a plurality of blocks of the data and the map data structure for each storage device initially being identified as a current map for the data, the method comprising:
  sending a first command to the plurality of storage devices instructing the snapshot of the data to be prepared, wherein a timestamp for the snapshot is associated with the first command and each storage device has information that indicates the last time that a snapshot was started on the volume and the last time that any data corresponding to the current map was updated or prepared for update and wherein each storage device receiving the first command determines from the timestamp and the information whether data corresponding to the current map was updated or prepared for update after a time indicated by the timestamp;
  receiving any affirmative responses from the plurality of storage devices, each affirmative response indicating that the corresponding storage device is able to form a new map data structure, the new map data structure initially being empty of physical addresses and the new map data structure for each storage device initially being identified as a tentative map data structure; and
  sending a second command to the plurality of storage devices, the second command instructing the snapshot to be committed if a quorum of affirmative responses is received, but not necessarily a response from each of the plurality of storage devices being received, and the second command instructing the snapshot to be aborted if the quorum of affirmative responses is not received.

28. The method according to claim 27, wherein if the data corresponding to the current map was updated or prepared for update after a time indicated by the timestamp at a storage device, the storage device does not return an affirmative response to the first command.

29. The method according to claim 28, the value of the timestamp for a retried snapshot after an abort is determined by adding to a present time an adjustment period in response to one or more attempted snapshots being aborted.

30. The method according to claim 29, wherein the adjustment period is at least the difference in time between the timestamp of an aborted snapshot and last time that any data corresponding to the current map was updated or prepared for update.

31. The method according to claim 15, the plurality of data storage devices being a group of devices designated for redundantly storing at least a portion of a data volume and wherein one or more additional groups of storage devices are each designated for storing a corresponding portion of the data volume add the snapshot being determined valid or invalid from information obtained from a quorum but not necessarily all of the groups of the storage devices.

32. The method according to claim 15, the plurality of data storage devices being a group of devices designated for redundantly storing at least a portion of a data volume and wherein one or more additional groups of storage devices are each designated for storing a corresponding portion of the data volume and the snapshot being determined valid or invalid from information obtained from only one group of the storage devices.

33. The method according to claim 31, further comprising recovering the snapshot if the snapshot is determined invalid.

34. The method according to claim 1, further comprising reading a data block that was last updated prior to a completed snapshot by following a plurality of the links to locate the most-recent version of the data block.

35. The method according to claim 15, wherein each of the data storage devices stores a replica of the data and the quorum comprises a majority of the data storage devices.

36. The method according to claim 15, wherein the data is erasure coded where m data blocks and p parity blocks are stored across a set of n of the storage devices, where n=m +p, the quorum is m+p/2 of the storage devices if p is even, and the quorum is m+(p+1)/2 if p is odd.

37. A computer readable media comprising computer code for implementing a method of taking a snapshot of data, the method comprising the steps of:
  obtaining a first map data structure that specifies a relationship of logical addresses to physical addresses for a plurality of data blocks of a volume, the first map data structure initially being identified as a current map for the volume;
  forming a second map data structure that is initially empty, the second map data structure initially being identified as a tentative map data structure for the volume;
  committing the snapshot by identifying the second map data structure as the current map for the volume and identifying the first map data structure as a snapshot for the volume;

taking one or more additional snapshots by repeating said steps of forming and committing for each additional snapshot, each snapshot being completed upon being committed and the snapshots being linked such that each snapshot is linked to a next most-recent snapshot, and performing writes to data blocks of the volume while taking the one or more additional snapshots by writing a data block to a new physical location and updating the map identified as the current map at the time of the write with a physical address of the data block being written, wherein each committed snapshot only contains values corresponding to the physical addresses of the data blocks of the volume that were written to while the map data structure for the snapshot was identified as the current map.

* * * * *

UNITED STATES PATENT AND TRADEMARK OFFICE
CERTIFICATE OF CORRECTION

PATENT NO.         : 7,363,444 B2  
APPLICATION NO. : 11/033343  
DATED                 : April 22, 2008  
INVENTOR(S)        : Minwen Ji Page 1 of 1

It is certified that error appears in the above-identified patent and that said Letters Patent is hereby corrected as shown below:

In column 14, line 42, in Claim 15, delete "That" and insert -- that --, therefor.

In column 15, line 16, in Claim 22, delete "method-according" and insert -- method according --, therefor.

In column 16, line 26, in Claim 31, delete "add" and insert -- and --, therefor.

In column 17, line 5, in Claim 37, delete "snapshot," and insert -- snapshot; --, therefor.

Signed and Sealed this

Nineteenth Day of May, 2009

JOHN DOLL  
*Acting Director of the United States Patent and Trademark Office*